(12) United States Patent
Ogyu et al.

(10) Patent No.: US 8,057,766 B2
(45) Date of Patent: Nov. 15, 2011

(54) EXHAUST GAS PURIFYING APPARATUS AND METHOD FOR PURIFYING EXHAUST GAS

(75) Inventors: Kazutake Ogyu, Ibi-gun (JP); Kenichi Makino, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 12/759,650

(22) Filed: Apr. 13, 2010

(65) Prior Publication Data

US 2011/0085953 A1    Apr. 14, 2011

(30) Foreign Application Priority Data

Oct. 8, 2009   (WO) .................. PCT/JP2009/067566

(51) Int. Cl.
*B01D 53/34*   (2006.01)
*B01D 53/92*   (2006.01)
*F01N 3/08*   (2006.01)

(52) U.S. Cl. ..................... 423/212; 423/213.2; 422/168; 422/177; 422/180; 60/311

(58) Field of Classification Search .................. 423/212, 423/213.2; 422/168, 177, 180; 60/311
See application file for complete search history.

(56) References Cited

U.S. PATENT DOCUMENTS

| | | | |
|---|---|---|---|
| 4,417,908 A | 11/1983 | Pitcher | |
| 4,718,926 A | 1/1988 | Nakamoto et al. | |
| 7,393,377 B2 * | 7/2008 | Kasai et al. | 55/523 |
| 7,625,538 B2 * | 12/2009 | Mogensen | 423/213.5 |
| 7,666,376 B2 * | 2/2010 | Dornseiffer et al. | 423/239.1 |
| 7,722,829 B2 * | 5/2010 | Punke et al. | 422/180 |
| 7,785,695 B2 * | 8/2010 | Ohno et al. | 428/116 |
| 2002/0174770 A1 | 11/2002 | Badeau et al. | |
| 2005/0011174 A1 | 1/2005 | Hong et al. | |
| 2005/0016141 A1 | 1/2005 | Hong et al. | |
| 2005/0191461 A1 | 9/2005 | Kasai et al. | |
| 2006/0093784 A1 | 5/2006 | Komori et al. | |

(Continued)

FOREIGN PATENT DOCUMENTS

DE   102008042372   4/2009

(Continued)

OTHER PUBLICATIONS

International Search Report for corresponding International Application No. PCT/JP2009/067566, Dec. 1, 2009.

(Continued)

*Primary Examiner* — Timothy Vanoy

(74) *Attorney, Agent, or Firm* — Ditthavong Mori & Steiner, P.C.

(57) ABSTRACT

An exhaust gas purifying apparatus includes a metal casing and a honeycomb filter installed in the metal casing. The honeycomb filter includes cells, a first end face, and a second end face. The cells include a first cell and a second cell provided alternately. The first cell includes an open end on the first end face side and a sealed end on the second end face side. The second cell includes an open end on the second end face side and a sealed end on the first end face side. A cross-sectional area of the first cell is smaller than a cross-sectional area of the second cell. The first end face is disposed on a gas inlet side of the metal casing. The second end face is disposed on a gas outlet side of the metal casing.

42 Claims, 10 Drawing Sheets

U.S. PATENT DOCUMENTS

| | | |
|---|---|---|
| 2006/0159602 A1* | 7/2006 | Ohno et al. .................. 422/211 |
| 2007/0217978 A1* | 9/2007 | Baican et al. ............... 423/213.2 |
| 2008/0261806 A1 | 10/2008 | Konstandopoulos et al. |
| 2009/0241495 A1 | 10/2009 | Yamada et al. |

FOREIGN PATENT DOCUMENTS

| | | |
|---|---|---|
| JP | 61-061608 | 3/1986 |
| JP | 2005-125182 | 5/2005 |
| JP | 2008-237969 | 10/2008 |
| JP | 2009-95827 | 5/2009 |
| JP | 2009-178705 | 8/2009 |
| WO | WO 2004/024293 | 3/2004 |
| WO | WO 2004/024294 | 3/2004 |
| WO | WO 2005/002709 | 1/2005 |

OTHER PUBLICATIONS

Extended European Search Report for corresponding EP Application No. 10156473.0-2321, May 27, 2010.

* cited by examiner

A-A line cross-sectional view

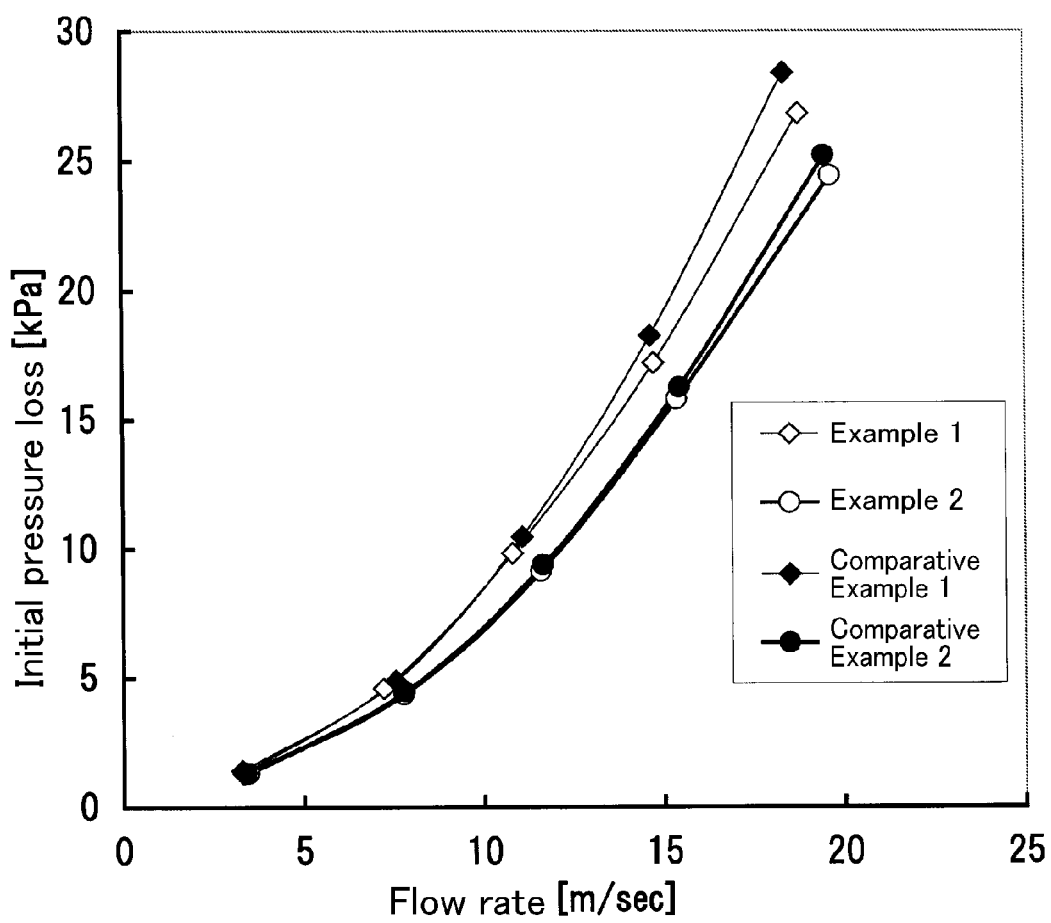

B-B line cross-sectional view

US 8,057,766 B2

EXHAUST GAS PURIFYING APPARATUS AND METHOD FOR PURIFYING EXHAUST GAS

CROSS-REFERENCE TO RELATED APPLICATIONS

The present application claims priority under 35 U.S.C. §119 to PCT/JP2009/067566 filed on Oct. 8, 2009, the contents of which are incorporated herein by reference in their entirety.

BACKGROUND OF THE INVENTION

1. Field of the Invention

The present invention relates to an exhaust gas purifying apparatus and a method for purifying an exhaust gas.

2. Discussion of the Background

Since emphasis has been put on environmental problems in recent years, an engine with good fuel economy and a small environmental impact is required in the auto industry. Advantageously, the diesel engine is superior in fuel economy to the gasoline engine. On the other hand, since particulate matters (hereinafter, also referred to as PMs), such as soot, are generated, it is necessary to purify PMs in exhaust gas by providing an exhaust gas purifying apparatus.

The gasoline engine advantageously has less emission of particulates such as soot compared with the diesel engine. Therefore, in general, it is presumably not necessary to provide an exhaust gas purifying apparatus for purifying PMs. On the other hand, disadvantageously, the gasoline engine is inferior in fuel economy to the diesel engine.

Since automobile buyers tend to make much of fuel economy of automobiles in recent years, the number of mounted gasoline direct injection engines (GDI) excellent in fuel economy among gasoline engines is expected to increase. However, since the exhaust gas emitted from the gasoline direct injection engines contain a small amount of PMs, it seems necessary to install an exhaust gas purifying apparatus and purify PMs in the exhaust gas.

The exhaust gas purifying apparatus used for purifying an exhaust gas emitted from a diesel engine is manufactured by installing, in a metal casing (casing), a filter made of materials such as ceramics. An exhaust gas can be purified by introducing the exhaust gas into the exhaust gas purifying apparatus from the gas inlet side thereof, passing the exhaust gas through the filter, and discharging the exhaust gas from the gas outlet side thereof.

As a ceramic filter for purifying PMs in an exhaust gas, U.S. Pat. No. 4,417,908 discloses a honeycomb filter which has a honeycomb structure and whose aperture area on the gas inlet side is larger than the aperture area on the gas outlet side. WO2004/024293 A1 discloses a honeycomb filter whose aperture area on the gas inlet side is larger than the aperture area on the gas outlet side and which is formed by combining a plurality of pillar-shaped porous ceramics members. WO2005/002709 A1 discloses a honeycomb filter whose aperture area on the gas inlet side is larger than the aperture area on the gas outlet side and whose pore-size distribution is adjusted to a predetermined range.

The contents of U.S. Pat. No. 4,417,908, WO2004/024293 A1 and WO2005/002709 A1 are incorporated herein by reference in their entirety.

SUMMARY OF THE INVENTION

According to one aspect of the present invention, an exhaust gas purifying apparatus includes a metal casing and a honeycomb filter. The metal casing includes a gas inlet side and a gas outlet side. The honeycomb filter is installed in the metal casing and includes cell walls, a first end face, and a second end face. The cell walls extend along a longitudinal direction of the honeycomb filter to define a plurality of cells between the cell walls. The plurality of cells include a first cell and a second cell provided alternately. The first cell includes an open end on aside of the first end face and a sealed end on a side of the second end face. The second cell includes an open end on a side of the second end face and a sealed end on a side of the first end face. A cross-sectional area of the first cell perpendicular to the longitudinal direction is smaller than a cross-sectional area of the second cell perpendicular to the longitudinal direction. The first end face of the honeycomb filter is disposed on the gas inlet side of the metal casing. The second end face of the honeycomb filter is disposed on the gas outlet side of the metal casing.

According to another aspect of the present invention, a method for purifying an exhaust gas includes introducing the exhaust gas emitted from an engine into an exhaust gas purifying apparatus from a gas inlet side of a metal casing of the exhaust gas purifying apparatus. The exhaust gas is discharged from a gas outlet side of the metal casing. The exhaust gas purifying apparatus includes a honeycomb filter. The honeycomb filter is installed in the metal casing and includes cell walls, a first end face, and a second end face. The cell walls extend along a longitudinal direction of the honeycomb filter to define a plurality of cells between the cell walls. The plurality of cells include a first cell and a second cell provided alternately. The first cell includes an open end on a side of the first end face and a sealed end on a side of the second end face. The second cell includes an open end on a side of the second end face and a sealed end on a side of the first end face. A cross-sectional area of the first cell perpendicular to the longitudinal direction is smaller than a cross-sectional area of the second cell perpendicular to the longitudinal direction. The first end face of the honeycomb filter is disposed on the gas inlet side of the metal casing. The second end face of the honeycomb filter is disposed on the gas outlet side of the metal casing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a graph illustrating measurement results of initial pressure losses of Examples and Comparative Examples;

DESCRIPTION OF THE EMBODIMENTS

Figure 1:
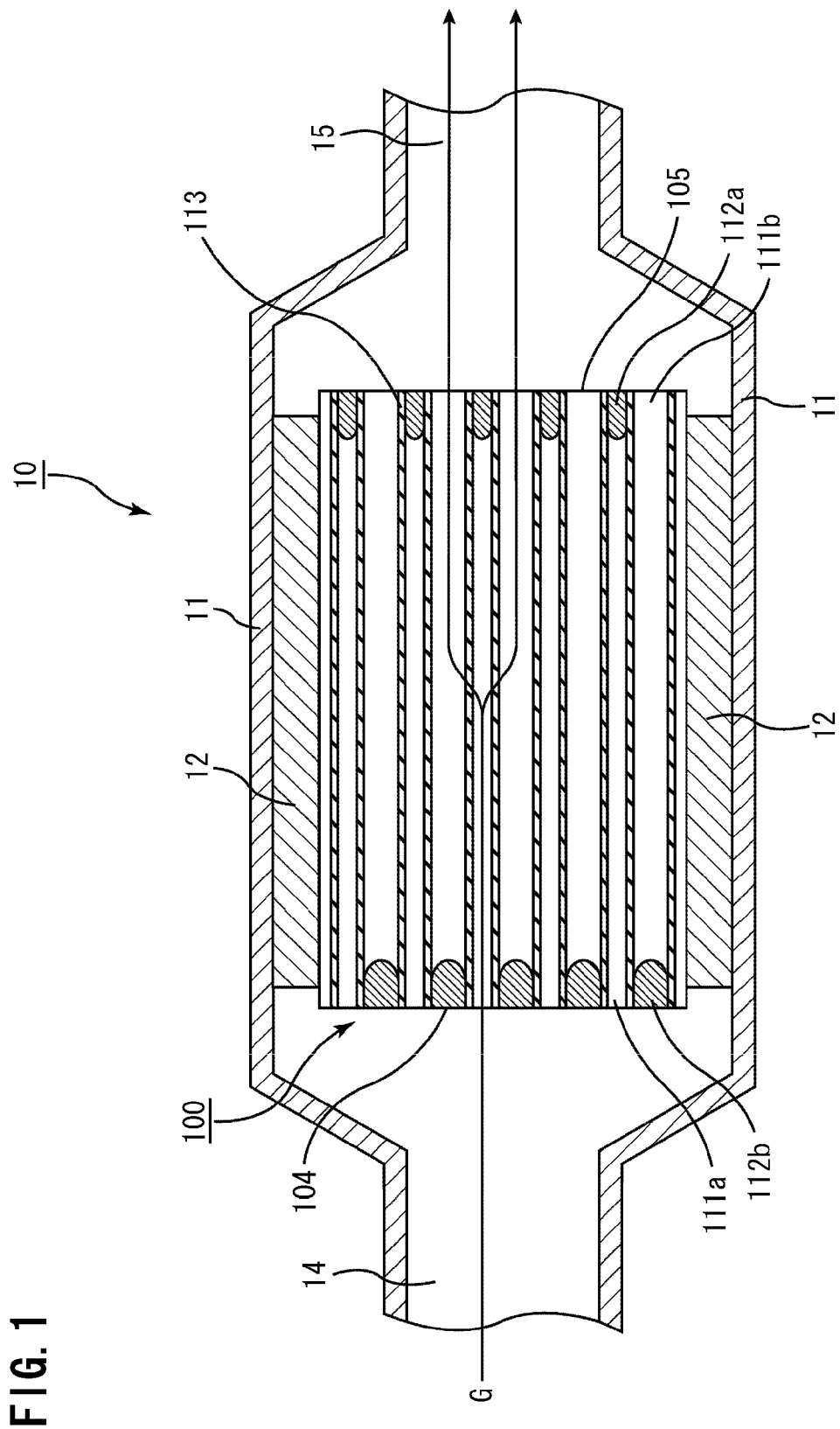
FIG. 1 is a cross-sectional view schematically illustrating one example of an exhaust gas purifying apparatus according to an embodiment of the present invention.

The honeycomb filter configured to capture PMs in exhaust gases described in U.S. Pat. No. 4,417,908, WO2004/024293 A1 and WO2005/002709 A1 has its object to purify an exhaust gas containing a large amount of PMs, a typical example of which is an exhaust gas emitted from a diesel engine. Such a honeycomb filter is designed to capture a large amount of PMs by making the aperture area of the gas inlet side larger than the aperture area of the gas outlet side.

Pressure loss is exemplified as an important property of the exhaust gas purifying apparatus using such a honeycomb filter.

Since a high pressure loss leads to deterioration of fuel economy, a low pressure loss is desirable.

With respect to the relationship between the pressure loss and the collection amount of PMs, it is empirically known that when an increase in the amount of PMs accumulated on the honeycomb filter results in an increase in pressure loss.

As described above, it seems necessary to purify PMs in the exhaust gas emitted from the gasoline direct injection engine. Also in the exhaust gas purifying apparatus used in this case, in the same manner as in the exhaust gas purifying apparatus for purifying PMs in the exhaust gas emitted from a diesel engine, it is desirable to have a low pressure loss. Therefore, an exhaust gas purifying apparatus having a low pressure loss, which is suitable for purifying an exhaust gas emitted from a gasoline direct injection engine, is desirable.

In the experiment to purify the exhaust gas emitted from the gasoline direct injection engine, the present inventors have investigated the factor that affects pressure loss when the exhaust gas from the gasoline direct injection engine is purified by using an exhaust gas purifying apparatus.

When the change of pressure loss with time was observed in the experiment to purify the exhaust gas emitted from the gasoline direct injection engine, the increase in pressure loss was hardly found even upon purifying an exhaust gas over a long period of time.

This presumably occurred for the following reason. The amount of PMs in the exhaust gas from the gasoline direct injection engine is smaller than the amount of PMs in the exhaust gas from the diesel engine. Therefore, even when an exhaust gas is purified over a long period of time, the amount of PMs accumulated on the honeycomb filter is small.

For this reason, it seems important to lower the initial pressure loss in the development of the exhaust gas purifying apparatus for a gasoline direct injection engine.

The present inventors have investigated the factor that affects the initial pressure loss of the exhaust gas purifying apparatus.

As a result, they have found that the aperture area on the gas outlet side of a honeycomb filter affects the value of the initial pressure loss. They also have found that when the aperture area on the gas outlet side of the honeycomb filter is made larger, the initial pressure loss is lowered.

They also have found that the exhaust gas purifying apparatus provided with such a honeycomb filter is particularly suitable for purifying an exhaust gas from a gasoline direct injection engine.

That is, an exhaust gas purifying apparatus according to an embodiment of the present invention includes: a metal casing provided with a gas inlet side and a gas outlet side; and a honeycomb filter installed in the metal casing, the honeycomb filter including a plurality of cells, a first end face, and a second end face, the plurality of cells being disposed in parallel with one another in a longitudinal direction with a cell wall therebetween, the plurality of cells including a first cell and a second cell provided alternately, the first cell including an open end on a side of the first end face and a sealed end on a side of the second end face, the second cell including an open end on a side of the second end face and a sealed end on a side of the first end face, a cross-sectional area of the first cell perpendicular to the longitudinal direction being smaller than a cross-sectional area of the second cell perpendicular to the longitudinal direction, the first end face of the honeycomb filter being disposed on the gas inlet side of the metal casing, and the second end face of the honeycomb filter being disposed on the gas outlet side of the metal casing.

Since the exhaust gas purifying apparatus according to the embodiments of the present invention includes a honeycomb filter whose aperture area on the gas inlet side is smaller than the aperture area on the gas outlet side, it may become easier to lower an initial pressure loss.

The exhaust gas purifying apparatus having a low initial pressure loss tends to be suitably used for purifying an exhaust gas of a gasoline direct injection engine having a small amount of PMs in the exhaust gas.

In the exhaust gas purifying apparatus according to the embodiments of the present invention, an aperture ratio of the first end face is from about 15% to about 30%, and an aperture ratio of the second end face is from about 35% to about 50%.

When the aperture ratio of the first end face is about 15% or more, exhaust gas is more likely to flow into cells, easily leading to a low pressure loss. On the other hand, when the aperture ratio of the first end face is about 30% or less, the aperture area on the gas outlet side is less likely to be relatively small, easily leading to a low initial pressure loss.

In the exhaust gas purifying apparatus according to the embodiments of the present invention, the cross-sectional area of the first cell perpendicular to the longitudinal direction is from about 60% to about 85% of the cross-sectional area of the second cell perpendicular to the longitudinal direction.

When the cross-sectional area of the first cell perpendicular to the longitudinal direction is about 60% or more of the cross-sectional area of the second cell perpendicular to the longitudinal direction, the volume of the first cell tends not to be too small, and the pressure loss resulting from the resistance upon the exhaust gas flowing into cells is also less likely to increase.

In the exhaust gas purifying apparatus according to the embodiments of the present invention, the cross section of the first cell perpendicular to the longitudinal direction has a substantially quadrangular shape, and the cross section of the second cell perpendicular to the longitudinal direction has a substantially octagonal shape.

In the exhaust gas purifying apparatus according to the embodiments of the present invention, the cross section of the first cell perpendicular to the longitudinal direction has a substantially quadrangular shape, and the cross section of the second cell perpendicular to the longitudinal direction has a substantially quadrangular shape in which at least one portion equivalent to a corner has a substantially arcuate shape.

In the exhaust gas purifying apparatus according to the embodiments of the present invention, the cross sections of the first cell and the second cell perpendicular to the longitudinal direction have curved sides.

In the exhaust gas purifying apparatus according to the embodiments of the present invention, the cross section of the first cell perpendicular to the longitudinal direction has a substantially quadrangular shape, and the cross section of the second cell perpendicular to the longitudinal direction has a substantially quadrangular shape.

The exhaust gas purifying apparatus provided with a honeycomb filter having cells of these shapes tends to be suitably used especially for purifying an exhaust gas of the gasoline direct injection engine.

In the exhaust gas purifying apparatus according to the embodiments of the present invention, the honeycomb filter includes a plurality of honeycomb fired bodies combined by interposing an adhesive layer.

In the exhaust gas purifying apparatus according to the embodiments of the present invention, the gas is an exhaust gas emitted from a gasoline engine.

The exhaust gas purifying apparatus can be suitably used for purifying an exhaust gas of the gasoline engine having a small amount of PMs in the exhaust gas.

A method for purifying an exhaust gas emitted from an engine by using an exhaust gas purifying apparatus according to an embodiment of the present invention, the method including: introducing the exhaust gas emitted from the engine from a gas inlet side of a metal casing into the exhaust gas purifying apparatus; and discharging the exhaust gas from a gas outlet side of the metal casing, the exhaust gas purifying apparatus including: the metal casing provided with the gas inlet side and the gas outlet side; and a honeycomb filter installed in the metal casing, the honeycomb filter including a plurality of cells, a first end face, and a second end face, the plurality of cells being disposed in parallel with one another in a longitudinal direction with a cell wall therebetween, the plurality of cells including a first cell and a second cell provided alternately, the first cell including an open end on a side of the first end face and a sealed end on a side of the second end face, the second cell including an open end on aside of the second end face and a sealed end on a side of the first end face, a cross-sectional area of the first cell perpendicular to the longitudinal direction being smaller than a cross-sectional area of the second cell perpendicular to the longitudinal direction, the first end face of the honeycomb filter being disposed on the gas inlet side of the metal casing, and the second end face of the honeycomb filter being disposed on the gas outlet side of the metal casing.

In the method for purifying an exhaust gas according to the embodiments of the present invention, an exhaust gas is introduced into the first cell having a small cross-sectional area perpendicular to the longitudinal direction and discharged from the second cell having a large cross-sectional area perpendicular to the longitudinal direction. When the exhaust gas is introduced into the exhaust gas purifying apparatus in such a direction, the initial pressure loss upon purifying the exhaust gas tends to be lowered.

In the method for purifying an exhaust gas according to the embodiments of the present invention, an aperture ratio of the first end face is from about 15% to about 30%, and an aperture ratio of the second end face is from about 35% to about 50%.

In the method for purifying an exhaust gas according to the embodiments of the present invention, the cross-sectional area of the first cell perpendicular to the longitudinal direction is from about 60% to about 85% of the cross-sectional area of the second cell perpendicular to the longitudinal direction.

In the method for purifying an exhaust gas according to the embodiments of the present invention, the cross section of the first cell perpendicular to the longitudinal direction has a substantially quadrangular shape, and the cross section of the second cell perpendicular to the longitudinal direction has a substantially octagonal shape.

In the method for purifying an exhaust gas according to the embodiments of the present invention, the cross section of the first cell perpendicular to the longitudinal direction has a substantially quadrangular shape, and the cross section of the second cell perpendicular to the longitudinal direction has a substantially quadrangular shape in which at least one portion equivalent to a corner has a substantially arcuate shape.

In the method for purifying an exhaust gas according to the embodiments of the present invention, the cross sections of the first cell and the second cell perpendicular to the longitudinal direction have curved sides.

In the method for purifying an exhaust gas according to the embodiments of the present invention, the cross section of the first cell perpendicular to the longitudinal direction has a substantially quadrangular shape, and the cross section of the second cell perpendicular to the longitudinal direction has a substantially quadrangular shape.

In the method for purifying an exhaust gas according to the embodiments of the present invention, the honeycomb filter includes a plurality of honeycomb fired bodies combined by interposing an adhesive layer.

In the method for purifying an exhaust gas according to the embodiments of the present invention, the engine is a gasoline engine.

The amount of PMs in an exhaust gas from the gasoline engine tends to be smaller than the amount of PMs in an exhaust gas from the diesel engine. Therefore, even when an exhaust gas is purified over a long period of time, the amount of PMs accumulated on the honeycomb filter is small, and the pressure loss tends not to increase much from the initial pressure loss. Accordingly, by using a method for purifying an exhaust gas that tends to lower the initial pressure loss, it may become easier to purify an exhaust gas over a long period of time at a low pressure loss.

First Embodiment

The following description will discuss a first embodiment, which is one embodiment of the exhaust gas purifying apparatus and the method for manufacturing the exhaust gas purifying apparatus, with reference to drawings.

First, the exhaust gas purifying apparatus of the present embodiment will be described.

FIG. 1 is a cross-sectional view schematically illustrating one example of an exhaust gas purifying apparatus according to an embodiment of the present invention.

The exhaust gas purifying apparatus 10 illustrated in FIG. 1 includes: a metal casing 11 provided with a gas inlet side 14 and a gas outlet side 15; and a honeycomb filter 100 installed in the metal casing 11. A holding sealing material 12 is provided between the honeycomb filter 100 and the metal casing 11, and the honeycomb filter 100 is held by the holding sealing material 12.

An introducing pipe is connected to the gas inlet side 14 of the metal casing 11. The introducing pipe is configured to introduce exhaust gases emitted from internal combustion engines, such as a direct injection gasoline engine, into the exhaust gas purifying apparatus 10. On the other hand, an exhaust pipe configured to discharge the exhaust gas that has passed through the exhaust gas purifying apparatus 10 is connected to the gas outlet side 15 of the metal casing 11.

One example of the honeycomb filter used for the embodiments of such an exhaust gas purifying apparatus will be described below.

Figure 2:
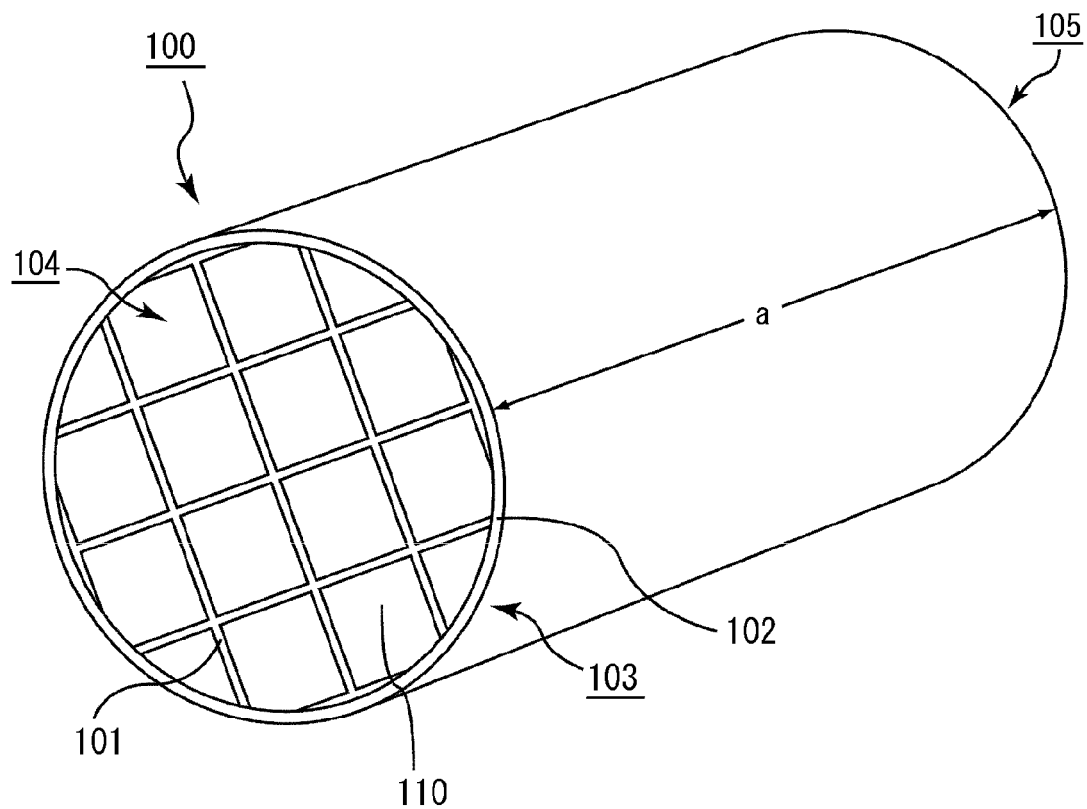
FIG. 2 is a perspective view schematically illustrating one example of a honeycomb filter used for an exhaust gas purifying apparatus of a first embodiment of the present invention.

FIG. 2 is a perspective view schematically illustrating one example of a honeycomb filter used for an exhaust gas purifying apparatus of a first embodiment of the present invention.

Figure 3A:
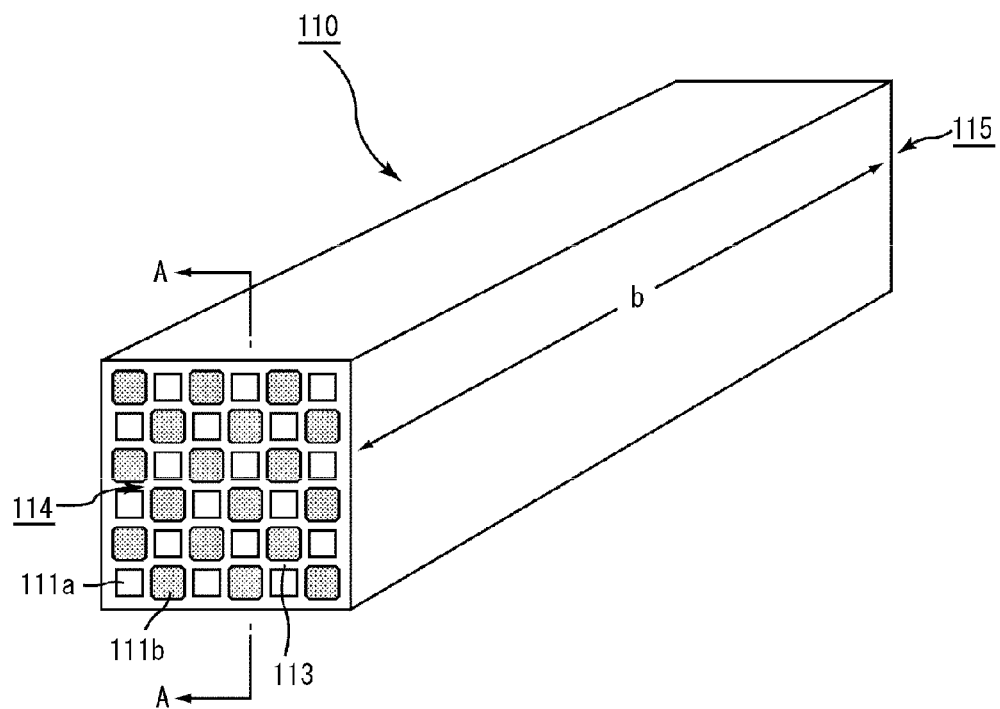
FIG. 3A is a perspective view schematically illustrating one example of a honeycomb fired body that configures the honeycomb filter shown in FIG. 2.
Figure 3B:
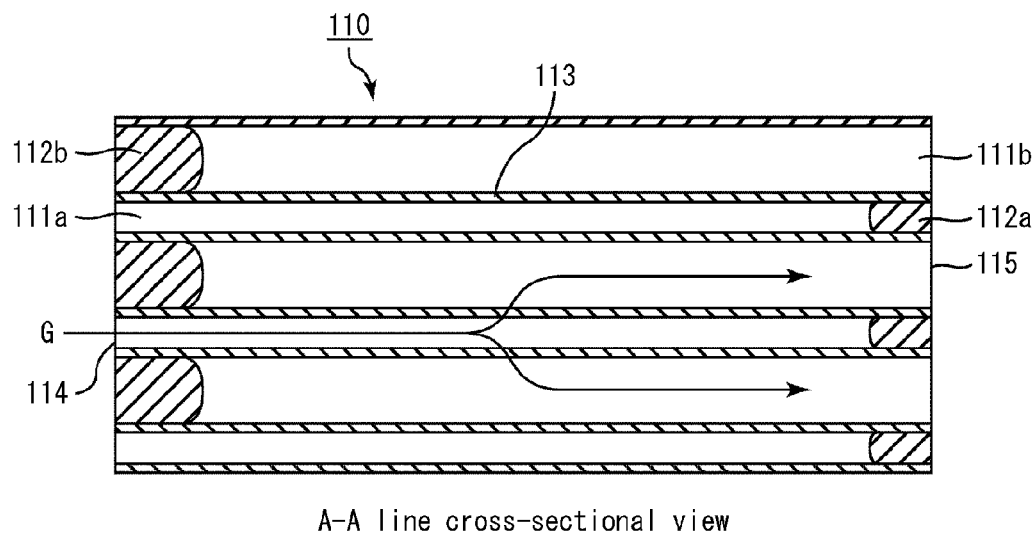
FIG. 3B is an A-A line cross-sectional view of the honeycomb fired body shown in FIG. 3A.

FIG. 3A is a perspective view schematically illustrating one example of a honeycomb fired body that configures the honeycomb filter shown in FIG. 2, and FIG. 3B is an A-A line cross-sectional view of the honeycomb fired body shown in FIG. 3A.

In the honeycomb filter 100 illustrated in FIG. 2, a plurality of honeycomb fired bodies 110 made of porous ceramics are combined by interposing an adhesive layer 101 to configure a ceramic block 103. A coat layer 102 is formed around the ceramic block 103 to prevent leakage of exhaust gases. Here, the coat layer may be formed if necessary.

Such a honeycomb filter formed by combining a plurality of honeycomb fired bodies is also referred to as an aggregated honeycomb filter. Silicon carbide, silicon-containing silicon carbide, and the like can be used as main components of the aggregated honeycomb filter.

The honeycomb filter 100 includes a plurality of cells, a first end face 104, and a second end face 105. The plurality of cells are disposed in parallel with one another in a longitudinal direction with a cell wall therebetween. The positional relationships between the first end face 104, the second end face 105, and the plurality of cells will be described below.

Here, the longitudinal direction of the honeycomb filter 100 is a direction illustrated by a double-pointed arrow "a" in FIG. 2.

In the honeycomb fired body 110 illustrated in FIG. 3A and FIG. 3B, first cells 111a having a relatively small cross-sectional area perpendicular to the longitudinal direction are second cells 111b having a relatively large cross-sectional area perpendicular to the longitudinal direction are alternately provided.

The cross section of the first cell 111a perpendicular to the longitudinal direction (indicated by a double-pointed arrow "b" in FIG. 3A) has a substantially quadrangular shape, and the cross section of the second cell 111b perpendicular to the longitudinal direction has a substantially octagonal shape.

The honeycomb fired body 110 has a first end face 114 and a second end face 115.

The first cell 111a includes an open end on a side of the first end face 114 of the honeycomb fired body 110 and an end sealed by a plug 112a on a side of the second end face 115 thereof. On the other hand, the second cell 111b includes an open end on a side of the second end face 115 of the honeycomb fired body 110 and an end sealed by a plug 112b on a side of the first end face 114 thereof. Moreover, a cell wall 113 that separates the first cell 111a and the second cell 111b functions as a filter.

That is, an exhaust gas "G" (in FIG. 3B, an exhaust gas is indicated by "G", and the flow of the exhaust gas is indicated by an arrow) that has flowed into the first cell 111a is always allowed to flow out from the second cell 111b after having passed through the cell wall 113.

The honeycomb filter 100 includes a plurality of honeycomb fired bodies 110 aligned and combined in such manner that the first end face 114 of the respective honeycomb fired bodies 110 corresponds to the first end face of the honeycomb filter 100. In this case, the second end face 115 of the respective honeycomb fired bodies 110 corresponds to the second end face 105 of the honeycomb filter 100.

Accordingly, the first cell 111a includes an open end on a side of the first end face 104 of the honeycomb filter 100 and a sealed end on a side of the second end face 105 thereof. On the other hand, the second cell 112a includes an open end on a side of the second end face 105 of the honeycomb filter 100 and a sealed end on aside of the first end face 104 thereof.

In the exhaust gas purifying apparatus of the present embodiment, an aperture ratio of the first end face 104 is from about 15% to about 30%, and an aperture ratio of the second end face 105 is from about 35% to about 50%.

The aperture ratio of the first end face 104 is desirably from about 21% to about 25%, and the aperture ratio of the second end face 105 is desirably from about 39% to about 46%.

The aperture ratio of the first end face is calculated by the following equation: "aperture ratio (%) of first end face=(total of aperture area of first cell/area of first end face)×100." The aperture ratio of the second end face is calculated by the following equation: "aperture ratio (%) of second end face= (total of aperture area of second cell/area of second end face)× 100."

In the honeycomb filter 100 of the present embodiment, the cross-sectional area of the first cell 111a perpendicular to the longitudinal direction is from about 60% to about 85% of the cross-sectional area of the second cell 111b perpendicular to the longitudinal direction.

The ratio of the cross-sectional area of a cell is also referred to as a "cross-sectional area ratio".

The cross-sectional area ratio is desirably from about 70% to about 84%. The cross-sectional area ratio is more desirably from about 70% to about 80%.

In the exhaust gas purifying apparatus 10 of the present embodiment, the first end face 104 of the honeycomb filter 100 is disposed on the gas inlet side 14 of the metal casing, and the second end face 105 of the honeycomb filter 100 is disposed on the gas outlet side 15 of the metal casing.

The method for purifying an exhaust gas according to the present embodiment by using the exhaust gas purifying apparatus 10 provided with the honeycomb filter 100 disposed in such a direction will be described with reference to FIG. 1.

As illustrated in FIG. 1, an exhaust gas (in FIG. 1, an exhaust gases is indicated by "G", and the flow of the exhaust gas is indicated by an arrow) emitted from the internal combustion engine and flowing into the exhaust gas purifying apparatus 10 from the gas inlet side 14 flows from the first end face 104 of the honeycomb filter 100 into the honeycomb filter 100. Since the first cell 111a having a small cross-sectional area is open on the side of the first end face 104 of the honeycomb filter 100, the exhaust gas "G" flows into the first cell 111a.

The exhaust gas "G" passes through the cell wall 113 that separates the first cell 111a and the second cell 111b. In this case, PMs in the exhaust gas "G" are captured in the cell wall 113 to purify the exhaust gas "G".

The purified exhaust gas "G" flows into the second cell 111b having a large cross-sectional area, and is discharged outside the honeycomb filter 100 from the side of the second end face 105 of the honeycomb filter 100. Then, the exhaust gas "G" is discharged outside the exhaust gas purifying apparatus 10 from the gas outlet side 15 of the exhaust gas purifying apparatus 10.

In the aforementioned method for purifying an exhaust gas, an exhaust gas is allowed to flow into the first cell 111a having a small cross-sectional area and flow out from the second cell 111b having a large cross-sectional area. When the exhaust gas is allowed to flow in and out from the honeycomb filter 100 as described above, it may become easier to purify the exhaust gas at a low initial pressure loss.

The exhaust gas from a gasoline engine is purified in the method for purifying an exhaust gas according to the present embodiment.

That is, the exhaust gas purifying apparatus used for the method for purifying an exhaust gas according to the present embodiment is suitably used as a gasoline particulate filter.

Next, the method for manufacturing an exhaust gas purifying apparatus of the present embodiment will be described.

The method for manufacturing the honeycomb filter used for the exhaust gas purifying apparatus will be described first.

In the first place, silicon carbide powders having different average particle diameters as a ceramic material, an organic binder, a liquid plasticizer, a lubricant, and water are mixed to prepare a wet mixture for manufacturing a molded body.

Subsequently, the wet mixture is charged into an extrusion-molding apparatus and extrusion-molded to form a honeycomb molded body having a predetermined shape.

In this case, first cells having a substantially quadrangular cross section perpendicular to the longitudinal direction and a small cross-sectional area and second cells having a substantially octagonal cross section perpendicular to the longitudinal direction and a large cross-sectional area are alternately provided to manufacture a honeycomb molded body by using a die.

Next, the two ends of the honeycomb molded body are cut by using a cutting machine so that the honeycomb molded body is cut into a predetermined length, and the cut honeycomb molded body is dried by using a drying apparatus.

Subsequently, a predetermined amount of a plug material paste to be a plug is injected into an end of either one of a first cell or a second cell to seal the cells. A honeycomb molded body with sealed cells is manufactured through such processes.

Next, a degreasing process is carried out to heat organic matters of the honeycomb molded body with the sealed cells in a degreasing furnace to manufacture a honeycomb degreased body. The shape of the honeycomb degreased body is substantially the same as the shape of the honeycomb fired body illustrated in FIG. 3A and FIG. 3B.

Then, the honeycomb degreased body is transported into a firing furnace, and then fired at about 2000° C. to about 2300° C. under argon atmosphere to manufacture a honeycomb fired body having a shape illustrated in FIG. 3A and FIG. 3B.

Subsequently, a bonding process is performed by forming an adhesive paste layer between the honeycomb fired bodies, heating and solidifying the adhesive paste layer to form a adhesive layer, and bonding a plurality of honeycomb fired bodies by interposing an adhesive layer to form a ceramic block.

An adhesive paste containing inorganic fibers and/or a whisker, an inorganic binder, and an organic binder is suitably used as an adhesive paste.

In the bonding process, the respective honeycomb fired bodies are aligned to bond a plurality of honeycomb fired bodies in such a manner that first end faces of the respective honeycomb fired bodies are in the same direction.

Then, the peripheral cutting process is performed by cutting the outer periphery of a ceramic block with a diamond cutter to form a ceramic block having a substantially round pillar shape.

Further, the forming process of the coat layer is performed by applying a sealing material paste to the peripheral surface of the ceramic block having a substantially round pillar shape, and drying and solidifying the sealing material paste to form a coat layer.

It is to be noted that the same paste as the sealing material paste can be used as the adhesive paste. The honeycomb filter is manufactured by the above processes.

Then, an exhaust gas purifying apparatus is manufactured by using this honeycomb filter.

Upon manufacturing the exhaust gas purifying apparatus, the honeycomb filter is disposed in the metal casing so that the first end face of the honeycomb filter corresponds to the gas inlet side of the metal casing, and the second end face of the honeycomb filter corresponds to the gas outlet side of the metal casing.

Specifically, a mat having a substantially quadrangular shape in a plan view and mainly including inorganic fibers is prepared as a holding sealing material, and the mat is wound around the honeycomb filter. It is possible to form an exhaust gas purifying apparatus by press-fitting in a cylindrical metal casing.

Alternatively, with the metal casing separable into two parts, a first metal casing and a second metal casing, the honeycomb filter around which a mat including inorganic fibers is wound is placed on the first metal casing, the second metal casing is placed on the honeycomb filter, and thereby the casings are sealed to provide an exhaust gas purifying apparatus.

Hereinafter, the effects of the exhaust gas purifying apparatus and the method for purifying an exhaust gas according to the present embodiment will be listed.

(1) Since the exhaust gas purifying apparatus of the present embodiment is provided with a honeycomb filter in which an aperture area on the gas inlet side is smaller than the aperture area on the gas outlet side, the initial pressure loss tends to be lowered.

(2) In the exhaust gas purifying apparatus of the present embodiment, the aperture ratio of the first end face is from about 15% to about 30%, and the aperture ratio of the second end face is from about 35% to about 50%.

When the aperture ratios are within the range, the exhaust gas is more likely to flow in cells, and the aperture area on the gas outlet side tends to be sufficiently large, whereby the initial pressure loss tends to be lowered.

(3) In the exhaust gas purifying apparatus of the present embodiment, the cross-sectional area of the first cell perpendicular to the longitudinal direction is from about 60% to about 85% of the cross-sectional area of the second cell perpendicular to the longitudinal direction.

Since the cross-sectional area of the first cell perpendicular to the longitudinal direction is about 60% or more of the cross-sectional area of the second cell perpendicular to the longitudinal direction, the volume of the first cell tends to be sufficiently large, and the pressure loss resulting from the resistance upon exhaust gas flowing into the cell tends to be low.

(4) In the method for purifying an exhaust gas according to the present embodiment, exhaust gases are allowed to flow into the first cell having a small cross-sectional area perpendicular to the longitudinal direction, and flow out from the second cell having a large cross-sectional area perpendicular to the longitudinal direction. When the exhaust gases are allowed to flow in the exhaust gas purifying apparatus in such a direction, the initial pressure loss upon purifying an exhaust gas tends to be lowered.

(5) The exhaust gas from a gasoline engine is purified in the method for purifying an exhaust gas of the present embodiment.

The amount of PMs in the exhaust gas from a gasoline engine tends to be smaller than the amount of PMs in the exhaust gas from a diesel engine. Therefore, even when an exhaust gas is purified over a long period of time, the amount of PMs accumulated on the honeycomb filter tends to be small, and the pressure loss tends not to increase much from the initial pressure loss. Accordingly, an exhaust gas tends to be purified even at a low pressure loss over a long period of time, by the method for purifying an exhaust gas of the present embodiment, which tends to lower the initial pressure loss.

EXAMPLES

The following description will discuss Examples that more specifically disclose the first embodiment of the present invention, and the present invention is not intended to be limited only by these Examples.

Example 1

An amount of 52.8% by weight of coarse powder of silicon carbide having an average particle diameter of 22 μm and 22.6% by weight of fine powder of silicon carbide having an average particle diameter of 0.5 μm were mixed. To the resulting mixture, 2.1% by weight of acrylic resin, 4.6% by weight of an organic binder (methylcellulose), 2.8% by weight of a lubricant (UNILUB, made by NOF Corporation), 1.3% by weight of glycerin, and 13.8% by weight of water were added, and then kneaded to prepare a wet mixture. The wet mixture was extrusion-molded, so that a raw honeycomb molded body having substantially the same shape as the shape illustrated in FIG. 3A and having cells not sealed was manufactured.

Next, the raw honeycomb molded body was dried by using a microwave drying apparatus to obtain a dried body of the honeycomb molded body. A paste (wet mixture) having the same composition as the raw molded body was then filled into predetermined cells, and the honeycomb molded body was again dried by using a drying apparatus.

The dried honeycomb molded body was degreased at 400° C., and then fired at 2200° C. under normal pressure argon atmosphere for three hours so that a honeycomb fired body made of a silicon carbide sintered body, with a porosity of 45%, an average pore diameter of 15 μm, a size of 34.3 mm×34.3 mm×150 mm, the number of cells (cell density) of 300 pcs/inch$^2$ and a thickness of the cell wall of 0.25 mm (10 mil), was manufactured.

Figure 4:
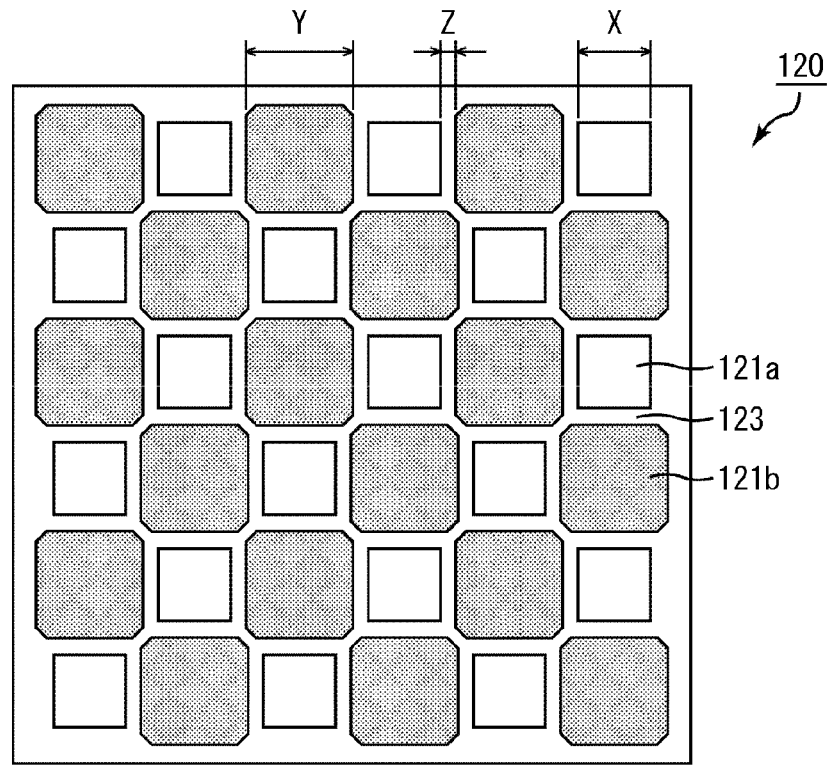
FIG. 4 is a side view of a first end face schematically illustrating a cell structure of the honeycomb fired body manufactured in Example 1.

FIG. 4 is a side view of the first end face schematically illustrating a cell structure of the honeycomb fired body manufactured in Example 1.

The cross section of the first cell 121a of the honeycomb fired body 120 manufactured in Example 1 has a substantially quadrangular shape (substantially square shape), and the length of one side (indicated by "X" in FIG. 4) is 0.87 mm. The cross section of the second cell 121b thereof has an octagonal shape, and the length indicated by "Y" in FIG. 4 is 1.37 mm. The thickness (indicated by "Z" in FIG. 4) of the cell wall 123 between the first cell 121a and the second cell 121b is 0.25 mm (10 mil).

The aperture area of the first cell is 0.76 mm$^2$, and the aperture area of the second cell is 1.09 mm$^2$. Therefore, the cross-sectional area ratio is 69.4%.

The aperture ratio of the first end face is 20.3%, and the aperture ratio of the second end face is 46.9%.

Subsequently, a large number of honeycomb fired bodies were bonded to one another by using a heat resistant adhesive paste containing 30% by weight of alumina fibers having an average fiber length of 20 μm, 21% by weight of silicon carbide particles having an average particle diameter of 0.6 μm, 15% by weight of silica sol (solid content: 30% by weight), 5.6% by weight of carboxymethyl cellulose, and 28.4% by weight of water. The adhesive paste was dried and solidified at 120° C. to form an adhesive layer, so that a rectangular pillar-shaped ceramic block was manufactured.

Then, the outer periphery of the rectangular pillar-shaped ceramic block was cut by using a diamond cutter to manufacture a substantially round pillar-shaped ceramic block.

Subsequently, the sealing material paste including the same composition as the adhesive paste was applied to the peripheral surface of the ceramic block, and the sealing material paste was dried and solidified at 120° C. to form a sealing material layer, so that a round pillar-shaped honeycomb filter was manufactured.

Hereinafter, such a honeycomb filter is referred to as a honeycomb filter α.

The honeycomb filter α has first end face and a second end face. The first cells, that is, cells with a small cross-sectional area, are open on the first end face side. The second cells, that is, cells with a large cross-sectional area, are open on the second end face side.

Then, the holding sealing material was wound around the honeycomb filter α and disposed in a metal casing to manufacture an exhaust gas purifying apparatus. When the honeycomb filter α is disposed in the metal casing, the first end face of the honeycomb filter α was disposed on the gas inlet side of the metal casing, and the second end face of the honeycomb filter α was disposed on the gas outlet side of the metal casing.

Comparative Example 1

An exhaust gas purifying apparatus was manufactured in the same manner as in Example 1, except that a direction in which a honeycomb filter was disposed in a metal casing was made opposite to the direction in Example 1 by use of the same honeycomb filter α as in Example 1.

That is, the second end face of the honeycomb filter a was disposed on the gas inlet side of the metal casing, and the first end face of the honeycomb filter α was disposed on the gas outlet side of the metal casing.

Example 2

An amount of 54.6% by weight of coarse powder of silicon carbide having an average particle diameter of 22 μm and 23.4% by weight of fine powder of silicon carbide having an average particle diameter of 0.5 μm were mixed. To the resulting mixture, 4.3% by weight of an organic binder (methylcellulose), 2.6% by weight of a lubricant (UNILUB, made by NOF Corporation), 1.2% by weight of glycerin, and 13.9% by weight of water were added, and then kneaded to prepare a wet mixture. The wet mixture was extrusion-molded, so that a raw honeycomb molded body having substantially the same shape as the shape illustrated in FIG. 3A and having cells not sealed was manufactured.

The honeycomb molded body was dried, degreased, and fired in the same manner as in Example 1, so that a honeycomb fired body made of a silicon carbide sintered body, with a porosity of 42%, an average pore diameter of 12 μm, a size of 34.3 mm×34.3 mm×150 mm, the number of cells (cell density) of 350 pcs/inch$^2$ and a thickness of the cell wall of 0.28 mm (11 mil), was manufactured.

Figure 5:
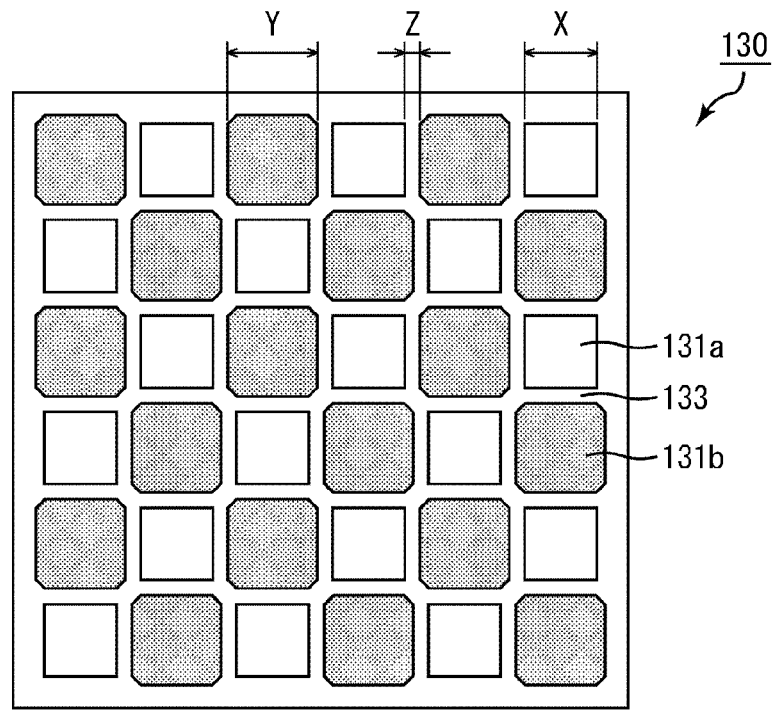
FIG. 5 is a side view of a first end face schematically illustrating a cell structure of the honeycomb fired body manufactured in Example 2.

FIG. 5 is a side view of the first end face schematically illustrating a cell structure of the honeycomb fired body manufactured in Example 2.

The cross section of the first cell 131a of the honeycomb fired body 130 manufactured in Example 2 has a substantially quadrangular shape (substantially square shape), and the length of one side (indicated by "X" in FIG. 5) is 0.97 mm. The cross section of the second cell 131b thereof has an octagonal shape, and the length indicated by "Y" in FIG. 5 is 1.21 mm. The thickness (indicated by "Z" in FIG. 5) of the cell wall 133 between the first cell 131a and the second cell 131b is 0.28 mm (11 mil).

The aperture area of the first cell is 0.94 mm$^2$, and the aperture area of the second cell is 1.12 mm$^2$. Therefore, the cross-sectional area ratio is 84.0%.

The aperture ratio of the first end face is 25.1%, and the aperture ratio of the second end face is 38.2%.

By using such a honeycomb fired body, a round pillar-shaped honeycomb filter was manufactured in the same manner as in Example 1.

Hereinafter, such a honeycomb filter is referred to as a honeycomb filter β.

The honeycomb filter β has a first end face and a second end face. The first cells, that is, cells with a small cross-sectional area, are open on the first end face side. The second cells, that is, cells with a large cross-sectional area, are open on the second end face side.

Then, the holding sealing material was wound around the honeycomb filter β and disposed in the metal casing to manufacture an exhaust gas purifying apparatus. When the honeycomb filter β was disposed in the metal casing, the first end face of the honeycomb filter β was disposed on the gas inlet side of the metal casing, and the second end face of the honeycomb filter β was disposed on the gas outlet side of the metal casing.

Comparative Example 2

An exhaust gas purifying apparatus was manufactured in the same manner as in Example 1, except that a direction in which a honeycomb filter is disposed in a metal casing was made opposite to the direction in Example 2 by use of the same honeycomb filter β as in Example 2.

That is, the second end face of the honeycomb filter β was disposed on the gas inlet side of the metal casing, and the first end face of the honeycomb filter β was disposed on the gas outlet side of the metal casing.

(Pressure Loss Measurement)

Figure 6:
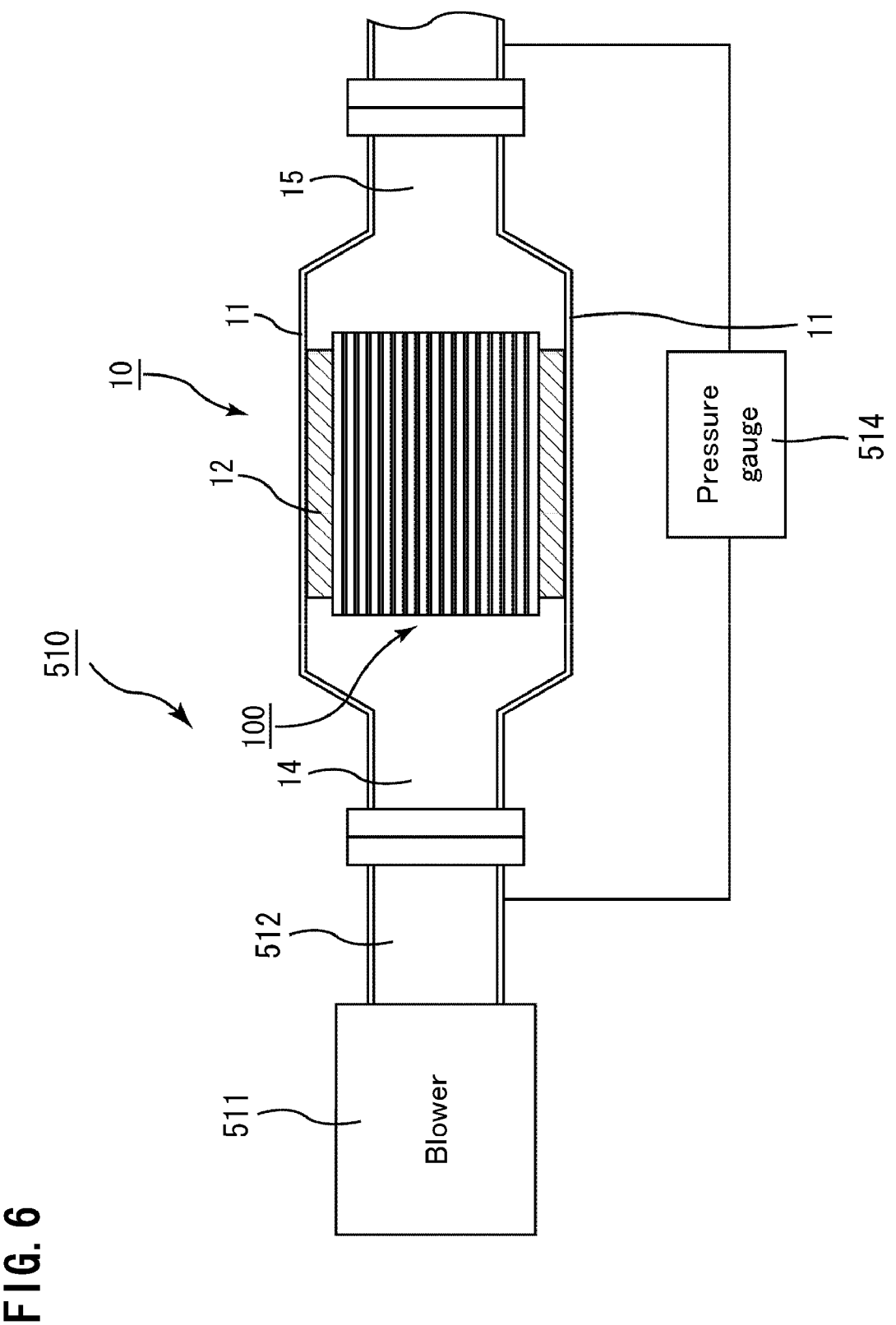
FIG. 6 is a cross-sectional view schematically illustrating a method for measuring a pressure loss according to an embodiment of the present invention.

The exhaust gas purifying apparatus manufactured in each Example and each Comparative Example was measured for pressure loss by using a pressure loss measuring apparatus as illustrated in FIG. 6.

FIG. 6 is a cross-sectional view schematically illustrating a method for measuring a pressure loss.

In the pressure loss measuring apparatus 510, a gas inlet side 14 of an exhaust gas purifying apparatus 10 is placed in an exhaust gas pipe 512 connected to a blower 511, and a pressure gauge 514 is attached so as to detect pressures before and after passing through the honeycomb filter 100.

Then, the blower 511 was operated to flow gas (air) into the honeycomb filter, and the differential pressure (pressure loss) five minutes after starting the operation was measured.

The exhaust gas purifying apparatus manufactured in each Example and each Comparative Example was measured for pressure loss by changing the flow rate of the gas (air), and the pressure loss (i.e., the initial pressure loss) in the state where PMs were not accumulated on the honeycomb filter was measured. Table 1 shows the obtained measurement results.

TABLE 1

|  | Flow rate [m/sec] | Initial pressure loss [kPa] |
|---|---|---|
| Example 1 | 3.31 | 1.30 |
|  | 7.22 | 4.60 |
|  | 10.80 | 9.82 |
|  | 14.73 | 17.20 |
|  | 18.75 | 26.82 |
| Example 2 | 3.47 | 1.30 |
|  | 7.78 | 4.36 |
|  | 11.59 | 9.14 |
|  | 15.37 | 15.80 |
|  | 19.64 | 24.42 |
| Comparative Example 1 | 3.29 | 1.40 |
|  | 7.55 | 4.88 |
|  | 11.07 | 10.46 |
|  | 14.64 | 18.26 |
|  | 18.34 | 28.40 |
| Comparative Example 2 | 3.39 | 1.30 |
|  | 7.80 | 4.46 |
|  | 11.65 | 9.38 |
|  | 15.44 | 16.26 |
|  | 19.47 | 25.20 |

FIG. 7 is a graph illustrating measurement results of initial pressure losses of Examples and Comparative Examples shown in Table 1.

The comparison between Example 1 and Comparative Example 1 with use of the honeycomb filter α shows that the pressure loss is lower in Example 1 irrespective of the flow rate. Further, the comparison between Example 2 and Comparative Example 2 with use of the honeycomb filter β shows that the pressure loss is lower in Example 2 irrespective of the flow rate.

That is, in the exhaust gas purifying apparatus provided with the honeycomb filter whose aperture area on the gas inlet side is smaller than the aperture area on the gas outlet side, it may become easier to lower the initial pressure loss.

Second Embodiment

The following will describe the second embodiment, one embodiment of the present invention.

In the present embodiment, the honeycomb filter disposed in the exhaust gas purifying apparatus includes one honeycomb fired body. The honeycomb filter including one honeycomb fired body is also referred to as an integral honeycomb filter.

Figure 8A:
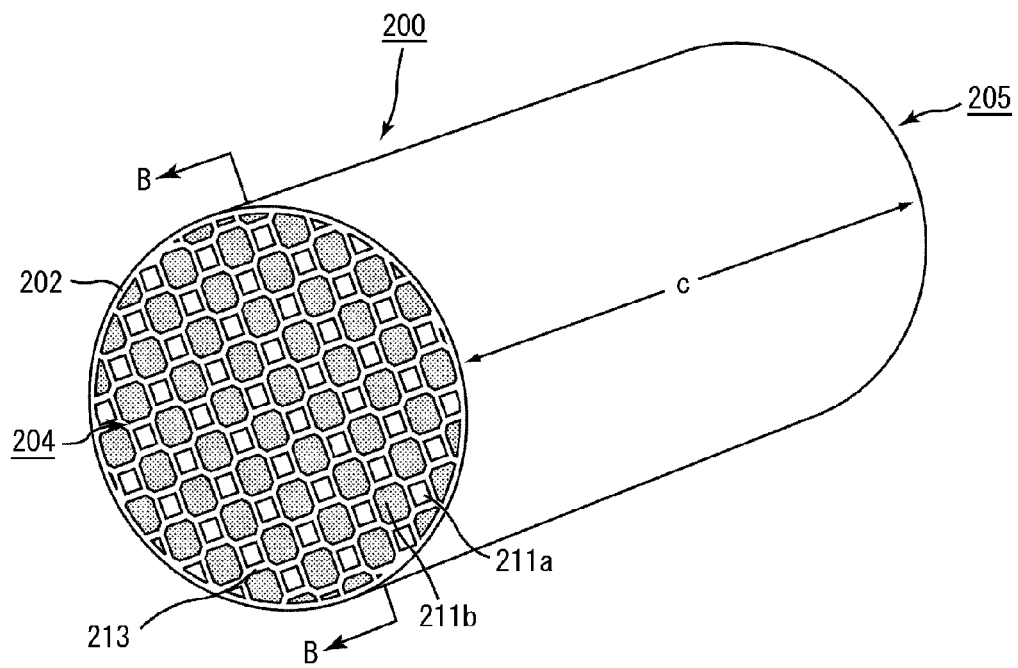
FIG. 8A is a perspective view schematically illustrating one example of a honeycomb filter used for an exhaust gas purifying apparatus of a second embodiment of the present invention.
Figure 8B:
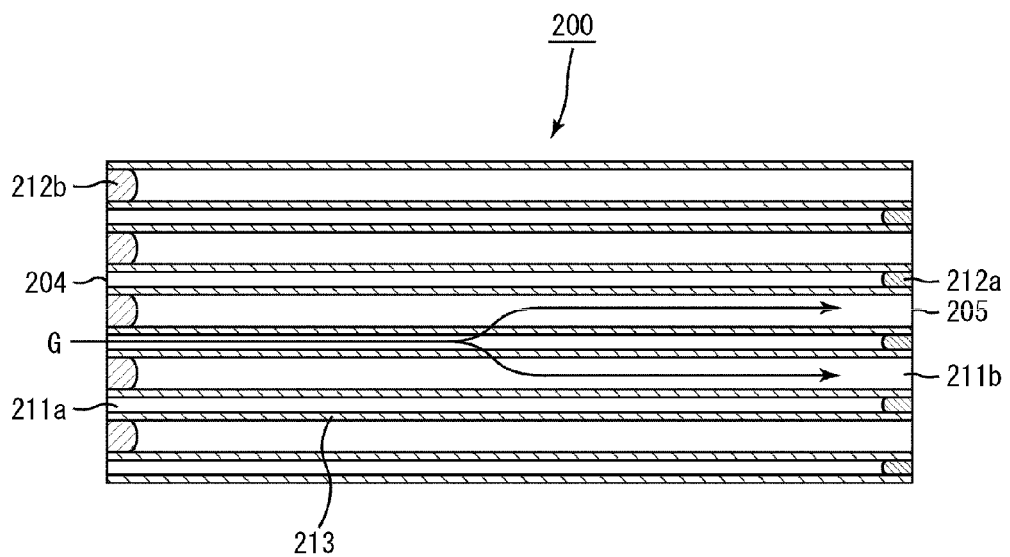
FIG. 8B is a B-B line cross-sectional view of the honeycomb filter shown in FIG. 8A.

FIG. 8A is a perspective view schematically illustrating one example of a honeycomb filter used for an exhaust gas purifying apparatus of a second embodiment of the present invention. FIG. 8B is a B-B line cross-sectional view of the honeycomb filter illustrated in FIG. 8A.

A honeycomb filter 200 illustrated in FIG. 8A has a substantially round pillar shape having a first end face 204 and a second end face 205, and has a first cell 211a with a small cross-sectional area perpendicular to the longitudinal direction (indicated by a double-pointed arrow "c" in FIG. 8A) and a second cell 211b with a large cross-sectional area perpendicular to the longitudinal direction.

The cross section of the first cell 211a perpendicular to the longitudinal direction has a substantially quadrangular shape, and the cross section of the second cell 211b perpendicular to the longitudinal direction has a substantially octagonal shape.

A coat layer 202 is formed on the peripheral side face of the honeycomb filter 200.

Cordierite, aluminum titanate, and the like can be used as main components of the integral honeycomb filter.

The first cell 211a includes an open end on a side of the first end face 204 of the honeycomb filter 200 and an end sealed by a plug 212a on a side of the second end face 205 thereof. On the other hand, the second cell 211b includes an open end on a side of the second end face 205 of the honeycomb filter 200 and an end sealed by a plug 212b on a side of the first end face 204. Moreover, a cell wall 213 that separate the first cell 211a and the second cell 211b functions as a filter.

That is, exhaust gases "G" that have flowed into the first cell 211a are always allowed to flow out from the second cell 211b after having passed through the cell wall 213.

In the exhaust gas purifying apparatus of the present embodiment, such a honeycomb filter 200 is disposed in such a manner that the first end face 204 is disposed on the gas inlet side of the metal casing, and the second end face 205 is disposed on the gas outlet side of the metal casing. In the method for purifying an exhaust gas of the present embodiment, an exhaust gas is purified in the way as in the method for purifying an exhaust gas of the first embodiment of the present invention by using the exhaust gas purifying apparatus of the present embodiment.

When the honeycomb filter used in the present embodiment is manufactured, a honeycomb molded body is manufactured in the same manner as in the first embodiment of the present invention, except that the honeycomb molded body molded by extrusion molding is larger than the honeycomb molded body described in the first embodiment of the present invention and the outer shapes are different.

Other processes are substantially the same as the processes for manufacturing the honeycomb filter in the first embodiment of the present invention. However, since a honeycomb filter includes one honeycomb fired body in the present embodiment, it is not necessary to perform the bonding process. Moreover, the peripheral cutting process is not necessarily performed when a round pillar-shaped honeycomb molded body is manufactured.

An exhaust gas purifying apparatus can be manufactured in the same manner as in the first embodiment of the present invention by using the obtained honeycomb filter.

Also in the exhaust gas purifying apparatus and the method for purifying an exhaust gas according to the present embodiment, the same effects (1) to (5) as in the first embodiment of the present invention can be exerted.

Other Embodiments

In the honeycomb filter used for the exhaust gas purifying apparatus according to the embodiments of the present invention, the embodiments of the first cell and the second cell are not limited to the embodiments thereof described above.

FIG. 9A, FIG. 9B, FIG. 9C, and FIG. 9D are side views each schematically illustrating one example of a first end face of the honeycomb fired body that configures an aggregated honeycomb filter according to an embodiment of the present invention.

Figure 10:
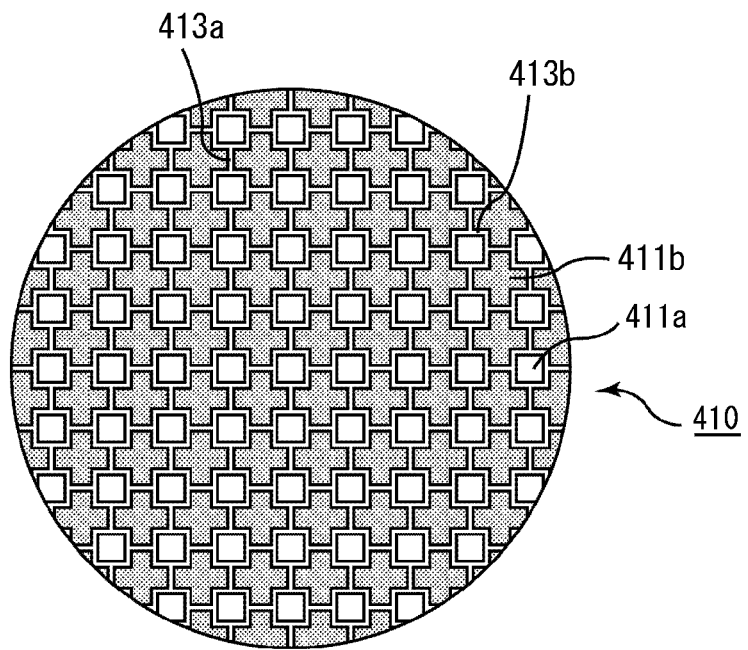
FIG. 10 is a side view schematically illustrating one example of a first end face of an integral honeycomb filter according to an embodiment of the present invention.
Figure 11:
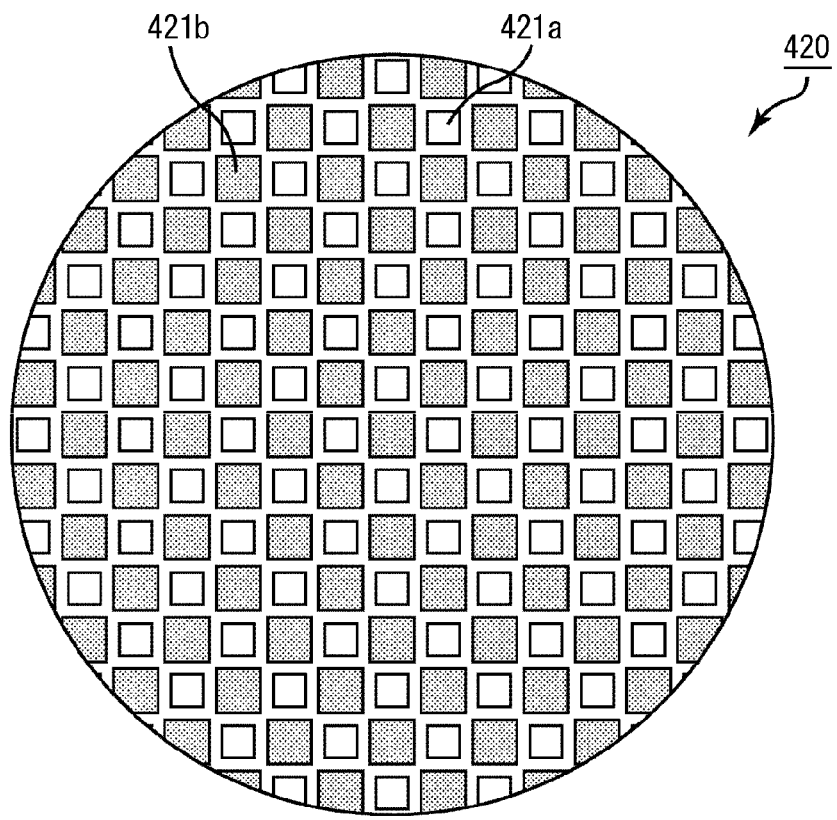
FIG. 11 is a side view schematically illustrating one example of a first end face of an integral honeycomb filter according to an embodiment of the present invention.

FIG. 10 and FIG. 11 are side views each schematically illustrating one example of a first end face of an integral honeycomb filter according to an embodiment of the present invention.

Each of these drawings is a side view seen from the first end face side of the honeycomb fired body or the honeycomb filter, i.e., the end face side in which the second cell is sealed.

Other embodiments of the cross-sectional shape of the first cell and the second cell of the honeycomb filter will be described by using these drawings.

Figure 9A:
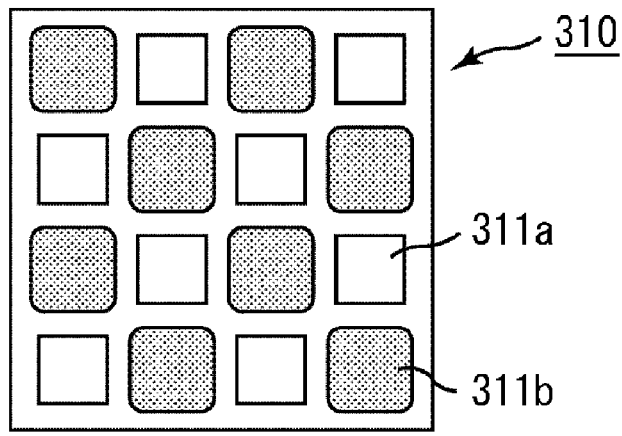
FIG. 9A, FIG. 9B, FIG. 9C, and FIG. 9D are side views each schematically illustrating one example of a first end face of an honeycomb fired body that configures an aggregated honeycomb filter according to an embodiment of the present invention.

In the honeycomb fired body 310 illustrated in FIG. 9A, the cross section of the first cell 311a perpendicular to the longitudinal direction has a substantially quadrangular shape, and the cross section of the second cell 311b perpendicular to the longitudinal direction has a substantially quadrangular shape in which at least one portion equivalent to a corner has a substantially arcuate shape.

Figure 9B:
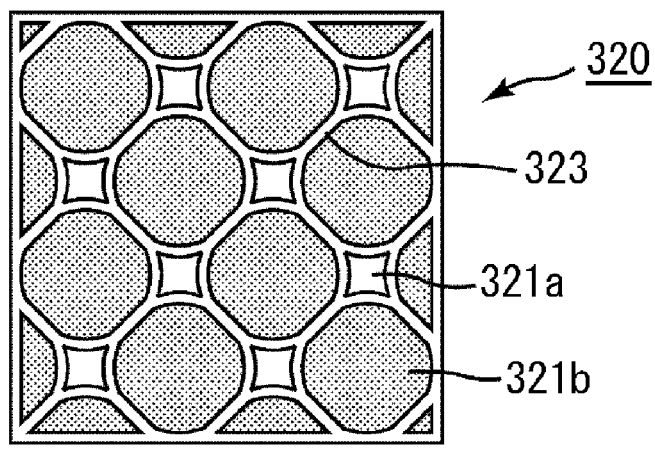

In a honeycomb fired body 320 illustrated in FIG. 9B, the cross sections of a first cell 321a and a second cell 321b perpendicular to the longitudinal direction have curved sides.

That is, in FIG. 9B, the cross section of a cell wall 323 has a curved shape.

In the shape of the cross section of the first cell 321a, the cell wall 323 is convex from the outside to the center of the cross section of the cell. In the shape of the cross section of the second cell 321b, the cell wall 323 is convex from the center to the outside of the cross section of the cell.

The cell wall 323 has a "wave" shape that rises and falls in horizontal and perpendicular directions of the cross section of the honeycomb fired body. Mountain portions (portions that exhibits the maximum amplitude in the sine curve) of the wave shape of the adjacent cell walls 323 make their closest approach to one another, whereby the first cells 321a whose cross section is dented inward and the second cells 321b whose cross section is dented outward are formed. It is to be noted that the amplitude of the wave shape may be constant or variable, and is desirably constant.

Figure 9C:
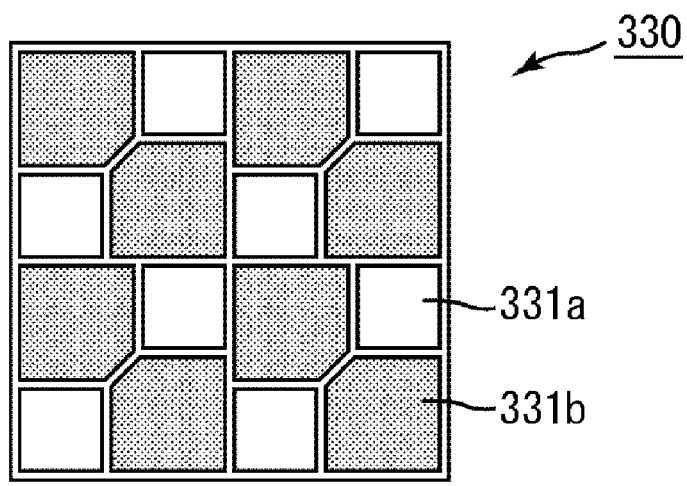

In a honeycomb fired body 330 illustrated in FIG. 9C, the cross section of a first cell 331a perpendicular to the longitudinal direction has a substantially quadrangular shape so that the first cells 331a are placed at portions diagonally facing each other within a greater quadrangle.

The cross section of a second cell 331b perpendicular to the longitudinal direction has a substantially pentagonal shape, and three corners of the pentagonal shape have substantially right angles.

Figure 9D:
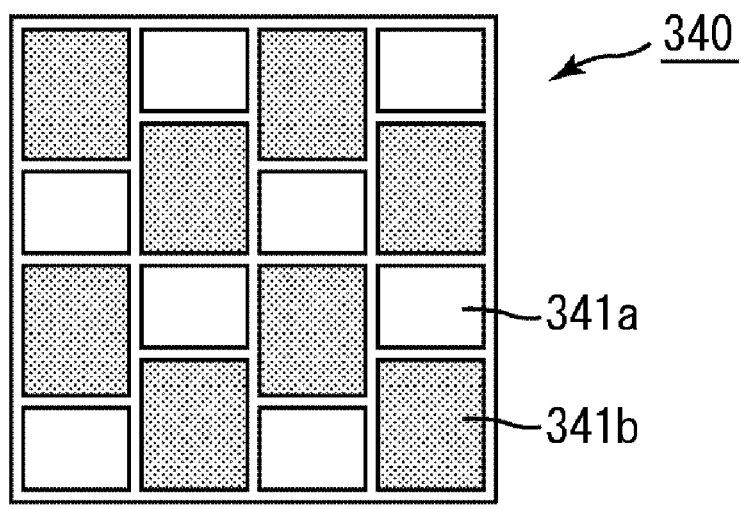

In the honeycomb fired body 340 illustrated in FIG. 9D, both the cross sections of the first cell 341a and the second cell 341b perpendicular to the longitudinal direction have substantially quadrangular shapes (substantially rectangular shapes), the combined shape of two first cells and two second cells is a substantially square shape.

In an integral honeycomb filter 410 illustrated in FIG. 10, substantially quadrangular first cells 411a are formed in the portions of checkered squares, second cells 411b have substantially quadrangular shapes with substantially quadrangular small four corners lacking (denting), and cell walls 413a and 413b separating these cells are formed.

In the integral honeycomb filter 420 illustrated in FIG. 11, the cross section of the first cell 421a perpendicular to the longitudinal direction has a substantially quadrangular shape, and the cross section of the second cell 421b perpendicular to the longitudinal direction has a substantially quadrangular shape.

Here, the integral honeycomb filter may have cross sections of cells illustrated in FIG. 9A, FIG. 9B, FIG. 9C, and FIG. 9D. The honeycomb fired body that configures an aggregated honeycomb filter may have cross sections illustrated in FIG. 10 and FIG. 11.

In each embodiment of the present invention, a distance between centers of gravity in the cross sections of the adjacently located first cells perpendicular to the longitudinal direction is desirably substantially equal to a distance between centers of gravity of the cross sections of the adjacently located second cells perpendicular to the longitudinal direction.

The expression "a distance between centers of gravity in the cross-sections of the adjacently located first cells perpendicular to the longitudinal direction" means that the minimum distance between a center of gravity in a cross section of one first cell perpendicular to the longitudinal direction and a center of gravity in a cross section of the adjacent first cell perpendicular to the longitudinal direction. On the other hand, the expression "a distance between centers of gravity in the cross section of the adjacently located second cells" means that the minimum distance between a center of gravity in a cross section of one second cell perpendicular to the longitudinal direction and a center of gravity in a cross section of the adjacent second cell perpendicular to the longitudinal direction.

When the two distances between centers of gravity are equal to each other, heat may easily diffuse homogeneously in case of regeneration of a honeycomb filter, whereby a local dispersion of temperature tends to disappears in the honeycomb filter. Hence, such a honeycomb filter being excellent in durability, i.e. where cracks and the like tend not to appear due to a thermal stress is obtained, even if it is repeatedly used for a long period of time.

In the present Description, the cross-sectional shape of the cells perpendicular to the longitudinal direction of the honeycomb filter is defined by the shape of the cells excluding imperfect cells (cells with a partially cut off cross section).

The shape of the honeycomb filter is not particularly limited to the substantially round pillar shape, and the honeycomb filter may have any desired pillar shape such as a substantially cylindroid shape, a substantially polygonal pillar shape.

The porosities of the honeycomb fired body that configures the honeycomb filter are not particularly limited, and are desirably from about 35% to about 60%.

The porosity of the honeycomb fired body of about 35% or more is less likely to cause clogging in the honeycomb filter in an early stage, while the porosity of the honeycomb fired body of about 60% or less tends not to cause a decrease in strength of the honeycomb filter with the result that the honeycomb filter is less likely to be broken.

The average pore diameter of the honeycomb fired body configuring the honeycomb filter is desirably from about 5 μm to about 30 μm.

The average pore diameter of the honeycomb fired body of about 5 μm or more is less likely to cause clogging in the particulate. On the other hand, when the average pore diameter of the honeycomb fired body is about 30 μm or less, the PMs is less likely to pass through the pores and thus the PMs can be sufficiently captured, possibly causing failure to function as a filter.

Here, the porosity and pore diameter can be measured through conventionally known methods such as mercury porosimetry, Archimedes method, a measuring method using a scanning electronic microscope (SEM).

The cell wall thickness of the honeycomb fired body is not particularly limited, and desirably from about 0.2 mm to about 0.4 mm.

When the cell wall thickness of the honeycomb fired body is about 0.2 mm or more, the cell wall which supports the honeycomb fired body is less likely to be so thin that it may become easier to hold the strength of the honeycomb fired body; whereas the thickness of the honeycomb fired body of about 0.4 mm or less is less likely to cause an increase in pressure loss.

The cell density on a cross section perpendicular to the longitudinal direction of the honeycomb fired body is not particularly limited. A desirable lower limit is about 31.0 pcs/cm$^2$ (about 200 pcs/in$^2$) and a desirable upper limit is about 93 pcs/cm$^2$ (about 600 pcs/in$^2$). A more desirable lower limit is about 38.8 pcs/cm$^2$ (about 250 pcs/in$^2$) and a more desirable upper limit is about 77.5 pcs/cm$^2$ (about 500 pcs/in$^2$).

The main component of constituent materials of the honeycomb fired body is not limited to silicon carbide. Examples of other ceramic materials include ceramic powders including: a nitride ceramic such as aluminum nitride, silicon nitride, boron nitride and titanium nitride; a carbide ceramic such as zirconium carbide, titanium carbide, tantalum carbide and tungsten carbide; oxide ceramics such as alumina, zirconia, cordierite, mullite, and aluminum titanate; and the like.

Of the above-mentioned possible components, non-oxide ceramics are desirable, with silicon carbide being particularly desirable. It is because silicon carbide is superior in heat resistance, mechanical strength, thermal conductivity, and the like. Moreover, the ceramic materials such as silicon-containing ceramic, in which metallic silicon is blended with the ceramics set forth above, as well as ceramic bound by silicon or silicate compounds can also be used as the constituent materials of the honeycomb fired body. Of these, those ceramics (silicon-containing silicon carbide) in which metallic silicon is blended with silicon carbide are desirably used.

In particular, silicon-containing silicon carbide ceramic containing about 60% by weight or more of silicon carbide is desirable.

The organic binder in the wet mixture is not particularly limited, and examples thereof include methyl cellulose, carboxymethyl cellulose, hydroxyethyl cellulose, polyethylene glycol, and the like. Of these, methylcellulose is more desirably used. In general, the blending amount of the organic binder is desirably from about 1 part by weight to about 10 parts by weight with respect to 100 parts by weight of the ceramic powder.

A plasticizer to be used upon preparing the wet mixture is not particularly limited, and for example, glycerin or the like may be used. Moreover, the lubricant is not particularly limited, and examples thereof include polyoxy alkylene compounds, such as polyoxyethylene alkyl ether and polyoxypropylene alkyl ether, and the like.

Specific examples of the lubricant include, for example, polyoxyethylene monobutyl ether, polyoxypropylene monobutyl ether, and the like.

Here, the mixed raw material powder may not contain the plasticizer and the lubricant.

Upon preparing the wet mixture, a dispersant solution may be used, and examples thereof include water, an organic solvent such as benzene, alcohol such as methanol and the like.

Moreover, a molding auxiliary may be added to the wet mixture.

The molding auxiliary is not particularly limited, and examples thereof include ethylene glycol, dextrin, fatty acid, fatty acid soap, polyalcohol, and the like.

Furthermore, a pore-forming agent, such as balloons that are fine hollow spheres including an oxide ceramic, spherical acrylic particles, and graphite may be added to the wet mixture, if necessary.

With respect to the balloons, not particularly limited, for example, alumina balloons, glass micro-balloons, shirasu balloons, fly ash balloons (FA balloons), mullite balloons and the like may be used. Of these, alumina balloons are more desirably used.

Examples of the inorganic binder in the adhesive paste and the sealing material paste include silica sol, alumina sol and the like. Each of these may be used alone or two or more kinds of these may be used in combination. Silica sol is more desirably used among the inorganic binders.

Examples of the organic binder in the adhesive paste and the sealing material paste include polyvinyl alcohol, methyl cellulose, ethyl cellulose, carboxymethyl cellulose and the like. Each of these may be used alone or two or more kinds of these may be used in combination. Carboxymethyl cellulose is more desirably used among the organic binders.

Examples of the inorganic fibers in the adhesive paste and the sealing material paste include ceramic fibers, such as silica-alumina, mullite, alumina, silica and the like. Each of these may be used alone or two or more kinds of these may be used in combination. Alumina fibers are more desirably used among the inorganic fibers.

Examples of the inorganic particles in the adhesive paste and the sealing material paste include carbides, nitrides, and the like. Specific examples thereof include inorganic powder including silicon carbide, silicon nitride, boron nitride and the like. Each of these may be used alone, or two or more kinds of these may be used in combination. Of the inorganic particles, silicon carbide is desirably used due to its superior thermal conductivity.

Furthermore, a pore-forming agent, such as balloons that are fine hollow spheres including an oxide ceramic, spherical acrylic particles and graphite may be added to the adhesive paste and the sealing material paste, if necessary. The balloons are not particularly limited, and for example, alumina balloons, glass micro-balloons, shirasu balloons, fly ash balloons (FA balloons), mullite balloons, and the like may be used. Of these, alumina balloons are more desirably used.

Moreover, a catalyst may be supported on the honeycomb filter.

In the honeycomb filter, by supporting a catalyst that is capable of converting toxic gas components such as CO, HC, NOx in exhaust gases, it is possible to sufficiently convert toxic gas components in exhaust gases through a catalytic reaction. Further, by supporting a catalyst that helps the burning of PM, the PM can be more easily burned and removed.

The supporting process of a catalyst may be carried out on the honeycomb filter or on the honeycomb fired body.

In the case where a catalyst is supported, desirably, an alumina film having a large specific surface area is formed on the surface of the honeycomb filter or the honeycomb fired body, and a co-catalyst as well as a catalyst such as platinum is adhered to the surface of this alumina film.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An exhaust gas purifying apparatus comprising:
  a metal casing comprising a gas inlet side and a gas outlet side; and
  a honeycomb filter installed in said metal casing and comprising cell walls, a first end face, and a second end face, the cell walls extending along a longitudinal direction of the honeycomb filter to define a plurality of cells between the cell walls, said plurality of cells comprising:
  a first cell and a second cell provided alternately;
  said first cell comprising an open end on a side of said first end face and a sealed end on a side of said second end face;
  said second cell comprising an open end on a side of said second end face and a sealed end on a side of said first end face; and
  a cross-sectional area of said first cell perpendicular to said longitudinal direction being smaller than a cross-sectional area of said second cell perpendicular to said longitudinal direction throughout the entire length of said honeycomb filter, said first end face of the honeycomb filter being disposed on said gas inlet side of said metal casing, and said second end face of the honeycomb filter being disposed on said gas outlet side of said metal casing.

2. The exhaust gas purifying apparatus according to claim 1,
  wherein
  an aperture ratio of said first end face is from about 15% to about 30%, and
  an aperture ratio of said second end face is from about 35% to about 50%.

3. The exhaust gas purifying apparatus according to claim 1,
  wherein the cross-sectional area of said first cell perpendicular to said longitudinal direction is from about 60% to about 85% of the cross-sectional area of said second cell perpendicular to said longitudinal direction.

4. The exhaust gas purifying apparatus according to claim 1,
  wherein
  a cross section of said first cell perpendicular to said longitudinal direction has a substantially quadrangular shape, and
  a cross section of said second cell perpendicular to said longitudinal direction has a substantially octagonal shape.

5. The exhaust gas purifying apparatus according to claim 1,
  wherein
  a cross section of said first cell perpendicular to said longitudinal direction has a substantially quadrangular shape, and
  a cross section of said second cell perpendicular to said longitudinal direction has a substantially quadrangular shape in which at least one portion equivalent to a corner has a substantially arcuate shape.

6. The exhaust gas purifying apparatus according to claim 1,
  wherein cross sections of said first cell and said second cell perpendicular to said longitudinal direction have curved sides.

7. The exhaust gas purifying apparatus according to claim 1,
  wherein
  a cross section of said first cell perpendicular to said longitudinal direction has a substantially quadrangular shape, and
  a cross section of said second cell perpendicular to said longitudinal direction has a substantially quadrangular shape.

8. The exhaust gas purifying apparatus according to claim 1,
  wherein said honeycomb filter comprises a plurality of honeycomb fired bodies combined with each other with an adhesive layer interposed between the plurality of honeycomb fired bodies.

9. The exhaust gas purifying apparatus according to claim 1,
wherein said gas comprises an exhaust gas emitted from a gasoline engine.

10. The exhaust gas purifying apparatus according to claim 1,
wherein a coat layer is formed on a periphery of the honeycomb filter.

11. The exhaust gas purifying apparatus according to claim 8,
wherein a main component of constituent materials of the honeycomb filter comprises at least one of silicon carbide and silicon carbide containing silicon.

12. The exhaust gas purifying apparatus according to claim 2,
wherein the aperture ratio of said first end face is from about 21% to about 25%, and the aperture ratio of said second end face is from about 39% to about 46%.

13. The exhaust gas purifying apparatus according to claim 3,
wherein the cross-sectional area of said first cell perpendicular to said longitudinal direction is from about 70% to about 84% of the cross-sectional area of said second cell perpendicular to said longitudinal direction.

14. The exhaust gas purifying apparatus according to claim 13,
wherein the cross-sectional area of said first cell perpendicular to said longitudinal direction is from about 70% to about 80% of the cross-sectional area of said second cell perpendicular to said longitudinal direction.

15. The exhaust gas purifying apparatus according to claim 1,
wherein the honeycomb filter comprises one honeycomb fired body.

16. The exhaust gas purifying apparatus according to claim 15,
wherein a main component of constituent materials of the honeycomb filter comprises at least one of cordierite and aluminum titanate.

17. The exhaust gas purifying apparatus according to claim 1,
wherein
a cross section of the first cell perpendicular to said longitudinal direction has a substantially quadrangular shape so that the first cell and another first cell are placed at portions diagonally facing each other within a greater quadrangle, and
a cross section of the second cell perpendicular to said longitudinal direction has a substantially pentagonal shape, and three corners of the pentagonal shape have substantially right angles.

18. The exhaust gas purifying apparatus according to claim 1,
wherein
both cross sections of the first cell and the second cell perpendicular to said longitudinal direction have substantially quadrangular shapes, and
a combined shape of two first cells and two second cells is a substantially square shape.

19. The exhaust gas purifying apparatus according to claim 1,
wherein a distance between centers of gravity in cross sections of adjacently located first cells perpendicular to said longitudinal direction is substantially equal to a distance between centers of gravity in cross sections of adjacently located second cells perpendicular to said longitudinal direction.

20. The exhaust gas purifying apparatus according to claim 1,
wherein a thickness of the cell walls is from about 0.2 mm to about 0.4 mm.

21. The exhaust gas purifying apparatus according to claim 1,
wherein a catalyst is supported on the honeycomb filter.

22. A method for purifying an exhaust gas, said method comprising:
introducing the exhaust gas emitted from an engine into an exhaust gas purifying apparatus from a gas inlet side of a metal casing of said exhaust gas purifying apparatus; and
discharging the exhaust gas from a gas outlet side of said metal casing,
said exhaust gas purifying apparatus comprising:
a honeycomb filter installed in said metal casing and comprising cell walls, a first end face, and a second end face, the cell walls extending along a longitudinal direction of the honeycomb filter to define a plurality of cells between the cell walls, said plurality of cells comprising:
a first cell and a second cell provided alternately;
said first cell comprising an open end on a side of said first end face and a sealed end on a side of said second end face;
said second cell comprising an open end on a side of said second end face and a sealed end on a side of said first end face; and
a cross-sectional area of said first cell perpendicular to said longitudinal direction being smaller than a cross-sectional area of said second cell perpendicular to said longitudinal direction throughout the entire length of said honeycomb filter, said first end face of the honeycomb filter being disposed on said gas inlet side of said metal casing, and said second end face of the honeycomb filter being disposed on said gas outlet side of said metal casing.

23. The method for purifying an exhaust gas according to claim 22,
wherein
an aperture ratio of said first end face is from about 15% to about 30%, and
an aperture ratio of said second end face is from about 35% to about 50%.

24. The method for purifying an exhaust gas according to claim 22,
wherein the cross-sectional area of said first cell perpendicular to said longitudinal direction is from about 60% to about 85% of the cross-sectional area of said second cell perpendicular to said longitudinal direction.

25. The method for purifying an exhaust gas according to claim 22,
wherein
a cross section of said first cell perpendicular to said longitudinal direction has a substantially quadrangular shape, and
a cross section of said second cell perpendicular to said longitudinal direction has a substantially octagonal shape.

26. The method for purifying an exhaust gas according to claim 22,
wherein
a cross section of said first cell perpendicular to said longitudinal direction has a substantially quadrangular shape, and
a cross section of said second cell perpendicular to said longitudinal direction has a substantially quadrangular shape in which at least one portion equivalent to a corner has a substantially arcuate shape.

27. The method for purifying an exhaust gas according to claim 22,
wherein cross sections of said first cell and said second cell perpendicular to said longitudinal direction have curved sides.

28. The method for purifying an exhaust gas according to claim 22,
wherein
a cross section of said first cell perpendicular to said longitudinal direction has a substantially quadrangular shape, and
a cross section of said second cell perpendicular to said longitudinal direction has a substantially quadrangular shape.

29. The method for purifying an exhaust gas according to claim 22,
wherein said honeycomb filter comprises a plurality of honeycomb fired bodies combined with each other with an adhesive layer interposed between the plurality of honeycomb fired bodies.

30. The method for purifying an exhaust gas according to claim 22,
wherein said engine comprises a gasoline engine.

31. The method for purifying an exhaust gas according to claim 22,
wherein a coat layer is formed on a periphery of the honeycomb filter.

32. The method for purifying an exhaust gas according to claim 29,
wherein a main component of constituent materials of the honeycomb filter comprises at least one of silicon carbide and silicon carbide containing silicon.

33. The method for purifying an exhaust gas according to claim 23,
wherein the aperture ratio of said first end face is from about 21% to about 25%, and the aperture ratio of said second end face is from about 39% to about 46%.

34. The method for purifying an exhaust gas according to claim 24,
wherein the cross-sectional area of said first cell perpendicular to said longitudinal direction is from about 70% to about 84% of the cross-sectional area of said second cell perpendicular to said longitudinal direction.

35. The method for purifying an exhaust gas according to claim 34,
wherein the cross-sectional area of said first cell perpendicular to said longitudinal direction is from about 70% to about 80% of the cross-sectional area of said second cell perpendicular to said longitudinal direction.

36. The method for purifying an exhaust gas according to claim 22,
wherein the honeycomb filter comprises one honeycomb fired body.

37. The method for purifying an exhaust gas according to claim 36,
wherein a main component of constituent materials of the honeycomb filter comprises at least one of cordierite and aluminum titanate.

38. The method for purifying an exhaust gas according to claim 22,
wherein
a cross section of the first cell perpendicular to said longitudinal direction has a substantially quadrangular shape so that the first cell and another first cell are placed at portions diagonally facing each other within a greater quadrangle, and
a cross section of the second cell perpendicular to said longitudinal direction has a substantially pentagonal shape, and three corners of the pentagonal shape have substantially right angles.

39. The method for purifying an exhaust gas according to claim 22,
wherein
both cross sections of the first cell and the second cell perpendicular to said longitudinal direction have substantially quadrangular shapes, and
a combined shape of two first cells and two second cells is a substantially square shape.

40. The method for purifying an exhaust gas according to claim 22,
wherein a distance between centers of gravity in cross sections of adjacently located first cells perpendicular to said longitudinal direction is substantially equal to a distance between centers of gravity in cross sections of adjacently located second cells perpendicular to said longitudinal direction.

41. The method for purifying an exhaust gas according to claim 22,
wherein a thickness of the cell walls is from about 0.2 mm to about 0.4 mm.

42. The method for purifying an exhaust gas according to claim 22,
wherein a catalyst is supported on the honeycomb filter.

* * * * *